United States Patent
Hoffmann et al.

(10) Patent No.: US 12,289,288 B2
(45) Date of Patent: Apr. 29, 2025

(54) METHOD AND APPARATUS FOR PROCESSING DNS QUERY AND RESPONSE MESSAGES, BY AN EDGE APPLICATION SERVER DISCOVERY FUNCTION (EASDF) OF A COMMUNICATION NETWORK, IN ACCORDANCE WITH HANDLING RULES

(71) Applicant: Nokia Solutions and Networks Oy, Espoo (FI)

(72) Inventors: Klaus Hoffmann, Munich (DE); Shubhranshu Singh, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/446,422

(22) Filed: Aug. 8, 2023

(65) Prior Publication Data

US 2024/0056417 A1 Feb. 15, 2024

(30) Foreign Application Priority Data

Aug. 9, 2022 (EP) .................................... 22189494

(51) Int. Cl.
*H04L 61/4511* (2022.01)
*H04L 67/141* (2022.01)
(Continued)

(52) U.S. Cl.
CPC ........ *H04L 61/4511* (2022.05); *H04L 67/141* (2013.01); *H04W 80/12* (2013.01); *H04L 2101/668* (2022.05)

(58) Field of Classification Search
CPC .............. H04L 61/4511; H04L 67/141; H04L 2101/668; H04L 67/146; H04W 80/12
See application file for complete search history.

(56) References Cited

U.S. PATENT DOCUMENTS

2024/0056318 A1* 2/2024 Yin .......................... H04L 9/40
2024/0154931 A1* 5/2024 Tonesi ................ H04L 61/4511
(Continued)

FOREIGN PATENT DOCUMENTS

CN          113691969 A      11/2021
WO    WO-2021064717 A1 *   4/2021    ............. H04L 45/04
(Continued)

OTHER PUBLICATIONS

Contavalli et al., "Client Subnet in DNS Queries", RFC 7871, Internet Engineering Task Force (IETF), May 2016, pp. 1-30.
(Continued)

*Primary Examiner* — Oanh Duong
(74) *Attorney, Agent, or Firm* — SQUIRE PATTON BOGGS (US) LLP

(57) ABSTRACT

A network entity of a communication network receives a first message from a user equipment, the first message including at least first information regarding a domain name server query. In accordance with a first handling rule, the first message is processed by including second information regarding a subnet option into the first message, and the processed first message is forwarded to a domain name server. The network entity receives a second message from the domain name server, the second message including a response to the domain name server query and the second information. In accordance with a second handling rule, the second message is processed by replacing the second information, and the processed second message is forwarded to the user equipment.

16 Claims, 4 Drawing Sheets

(51) Int. Cl.
*H04W 80/12* (2009.01)
*H04L 101/668* (2022.01)

(56) References Cited

U.S. PATENT DOCUMENTS

2024/0187374 A1* 6/2024 Tang .................. H04L 41/0806
2024/0244110 A1* 7/2024 Lee ..................... H04L 41/5025
2024/0283772 A1* 8/2024 Karampatsis ....... H04L 61/4511

FOREIGN PATENT DOCUMENTS

WO  WO-2021204292 A9 * 11/2021  .......... H04L 61/4511
WO  WO-2022206260 A1 * 10/2022  .......... H04L 61/4511
WO  WO-2022261244 A1 * 12/2022  ............. H04L 41/40

OTHER PUBLICATIONS

Damas et al., "Extension Mechanisms for DNS (EDNS(0))", RFC 6891, Internet Engineering Task Force (IETF), Apr. 2013, pp. 1-16.
"EDNS Client Subnet option correction", 3GPP TSG-SA WG2 Meeting #152E, S2-210xxxx, Nokia, Aug. 17-26, 2022, 19 pages.
"3rd Generation Partnership Project; Technical Specification Group Services and System Aspects; 5G System Enhancements for Edge Computing; Stage 2 (Release 17)", 3GPP TS 23.548, V17.3.0, Jun. 2022, pp. 1-55.
"3rd Generation Partnership Project; Technical Specification Group Core Network and Terminals; 5G System; Edge Application Server Discovery Services; Stage 3 (Release 17)", 3GPP TS 29.556, V17.1.0, Jun. 2022, pp. 1-67.
"3rd Generation Partnership Project; Technical Specification Group Services and System Aspects; System architecture for the 5G System (5GS); Stage 2 (Release 17)", 3GPP TS 23.501, V17.5.0, Jun. 2022, pp. 1-568.
"3rd Generation Partnership Project; Technical Specification Group Core Network and Terminals; 5G System; Technical Realization of Service Based Architecture; Stage 3 (Release 17)", 3GPP TS 29.500, V17.7.0, Jun. 2022, pp. 1-127.
"3rd Generation Partnership Project; Technical Specification Group Services and System Aspects; Policy and charging control framework for the 5G System (5GS); Stage 2 (Release 17)", 3GPP TS 23.503, V17.5.0, Jun. 2022, pp. 1-148.
"3rd Generation Partnership Project; Technical Specification Group Services and System Aspects; Procedures for the 5G System (5GS); Stage 2 (Release 17)", 3GPP TS 23.502, V17.5.0, Jun. 2022, pp. 1-744.
"3rd Generation Partnership Project; Technical Specification Group Services and System Aspects; Architecture enhancements for 5G System (5GS) to support network data analytics services (Release 17)", 3GPP TS 23.288, V17.5.0, Jun. 2022, pp. 1-207.
Extended European Search Report received for corresponding European Patent Application No. 22189494.2, dated Nov. 17, 2022, 10 pages.
"SMF selecting an EAS application server by taking into account NWDAF analytics", 3GPP TSG-SA WG2 Meeting #145e, S2-2105040, Agenda: 8.3, Lenovo, May 17-28, 2021, 7 pages.
"Providing parameters to EASDF for subscribing to Observed Service Experience Analytics per UP path", SA WG2 Meeting #144E e-meeting, S2-2102747, Agenda: 8.3, vivo, Apr. 12-16, 2021, 5 pages.
"EDNS Client Subnet option correction", 3GPP TSG-SA WG2 Meeting #152E, 2-2207398, Nokia, Aug. 17-26, 2022, 17 pages.
Communication under Rule 71(3) EPC dated Oct. 31, 2024 corresponding to European Patent Application No. 22189494.2.

* cited by examiner

METHOD AND APPARATUS FOR PROCESSING DNS QUERY AND RESPONSE MESSAGES, BY AN EDGE APPLICATION SERVER DISCOVERY FUNCTION (EASDF) OF A COMMUNICATION NETWORK, IN ACCORDANCE WITH HANDLING RULES

TECHNICAL FIELD

At least some example embodiments relate to a communication network such as a 3GPP communication network. For example, at least some example embodiments relate to 5G system enhancements for edge computing.

BACKGROUND

For DNS procedures, an EDNS Client Subnet (ECS) option has been defined. The ECS option is an extension that enables DNS query and response to also contain information on a subnet where a respective entity is hosted (see [C]). In [A] an "EDNS Client Subnet" option is mentioned as one functionality that an EADSF can offer. In other words, it is possible that in a 3GPP network this ECS option is used.

LIST OF ABBREVIATIONS

3GPP Third Generation Partnership Project
5G Fifth Generation
AF Application Function
BP Branching Point
C Central
DNAI Data Network Access Identifier
DNS Domain Name System
DNN Distributed Network Name
EAS Edge Application Server
EASDF EAS Discovery Function
ECS EDNS Client Subnet
EDNS Extension Mechanisms for DNS
FQDN Fully Qualified Domain Name
IP Internet Protocol
L Local
MT Mobile Termination
NEF Network Exposure Function
NF Network Function
NAT Network Address Translation
NRF NF Repository Function
OS Operations System
PDN Packet Data Network
PDU Protocol Data Unit
PGW PDN Gateway
PLMN Public Land Mobile Network
PSA PDU Session Anchor
SGW Serving Gateway
SMF Session Management Function
S-NSSAI Network Slice Selection Assistance Information
SUPI Subscription Permanent Identifier
TE Terminal Equipment
UDR User Data Repository
UE User Equipment
ULCL Uplink Classifier
UPF User Plane Function

LIST OF REFERENCES

[A] TS 23.548, version 17.3.0, in particular chapter 6.2: EAS Discovery and Re-discovery
[B] TS 29.556, version 17.1.0: Edge Application Server Discovery Services; Stage 3
[C] RFC 7871 (Client Subnet in DNS queries)
[D] RFC 6891 (Extension Mechanism for DNS (EDNS(0))

SUMMARY

At least some example embodiments deal with a client subnet option functionality in DNS procedures.

At least some example embodiments provide for methods, apparatuses and non-transitory computer-readable storage media as specified by the appended claims. According to at least some example embodiments, an apparatus of a communication network is provided, the apparatus comprising:
 means for receiving a first message from a user equipment, the first message including at least first information regarding a domain name server query;
 means for, in accordance with a first handling rule, processing the first message by including second information regarding a subnet option into the first message, and means for forwarding the processed first message to a domain name server;
 means for receiving a second message from the domain name server, the second message including a response to the domain name server query and the second information;
 means for, in accordance with a second handling rule, processing the second message by replacing the second information, and means for forwarding the processed second message to the user equipment.

According to at least some example embodiments, an apparatus of a communication network is provided, the apparatus comprising:
 means for deciding a first handling rule of processing a first message from a user equipment, the processing comprising including information regarding a subnet option into the first message;
 means for deciding a second handling rule of processing a second message towards a user equipment, the processing comprising removing the information regarding the subnet option from the second message; and
 means for sending a domain name system update request including the first and second handling rules to another apparatus for exchanging domain name system messages from the user equipment.

According to at least some example embodiments, the means comprises at least one processor, and at least one memory storing instructions that, when executed by the at least one processor, cause the performance of the apparatus.

According to some aspects, there is provided the subject matter of the independent claims. Some further aspects are defined in the dependent claims.

In the following some example embodiments will be described with reference to the accompanying drawings.

DESCRIPTION OF THE EMBODIMENTS

Figure 1:
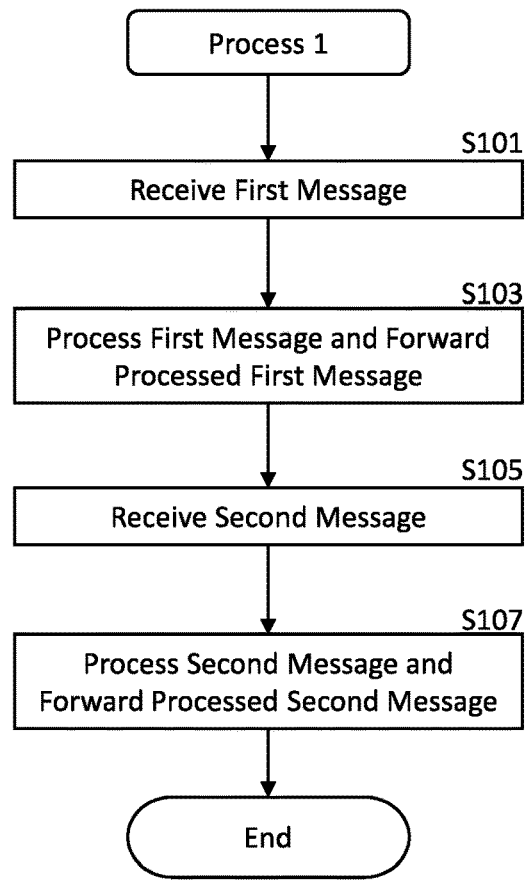
FIG. 1 shows a flowchart illustrating a process 1 according to at least some example embodiments.

At least some example embodiments relate to a first network entity of a communication network, the first network entity having a first functionality and comprising at least one of the following: UPF, SGW-U (user plane of SGW), PGW-U (user plane of PGW), or EASDF.

Further, at least some example embodiments relate to a second network entity of a communication network, the second network entity having a second functionality and comprising at least one of the following: SMF, SGW-C (control plane of SGW), or PGW-C (control plane of PGW).

According to at least some example embodiments, the communication network comprises a 5G system, but is not limited thereto. The communication network may comprise also future communication systems.

For PDU Session with Session Breakout connectivity model, based on UE subscription (e.g. DNN) and/or operator's configuration, a DNS Query sent by UE is handled by the first network entity, or by a local or central DNS resolver/server. According to at least some example embodiments, the DNS Query sent by UE may or may not carry an EDNS Client Subnet option in the DNS message (which is also referred to in the following as "first message").

According to at least some example embodiments, the first functionality of the first network entity comprises handling DNS messages according to an instruction from the second network entity, the first functionality including:
  Receiving at least one of the following from the second network entity: DNS message handling rules or BaselineDNSPattern.
  Exchanging DNS messages from the UE.
  Forwarding DNS messages to C-DNS or L-DNS for DNS Query.
  Adding a subnet option (also referred to here as "client subnet option") (e.g. EDNS Client Subnet (ECS) option) into DNS Query for an FQDN.
  Reporting, to the second network entity, the information related to the received DNS messages.
  Buffering/Discarding DNS messages from the UE or DNS Server.
The first network entity may further include one or more of the following functionalities:
  Registering to NRF for first network entity discovery and selection.
  Terminating DNS security, if used.

According to at least some example embodiments, the first network entity has direct user plane connectivity (i.e. without any NAT) with PSA UPF over N6 interface for transmission of DNS signaling exchanged with the UE. According to at least some example embodiments, the deployment of a NAT between EASDF and PSA UPF is not supported. According to at least some example embodiments, multiple EASDF instances are deployed within a PLMN. According to at least some example embodiments, interactions between 5GC NF(s) and the EASDF take place within a PLMN.

Below, two practical scenarios are indicated:
  a) UE does not add Client Subnet option to DNS query that it sends to the first network entity.
  b) UE adds Client Subnet option to DNS query that it sends to the first network entity.

According to at least some example embodiments, the first network entity replaces the Client Subnet Option (also referred to in the following as "third information") in the DNS query sent by the UE with a Client Subnet Option (also referred to in the following as "second information") in the DNS Query as associated with UPF PSA/DNAI pre-selected by the second network entity, and removes the Client Subnet Option associated with the pre-selected UPF PSA/DNAI from a DNS Response received from a DNS authoritative server.

According to at least some example embodiments, the first network entity re-inserts the original Client Subnet Option, i.e. the one received in the DNS query message from UE, in place of the DNS response possibly received in the DNS Query.

According to at least some example embodiments, the first network entity is instructed by the second network entity to perform these actions. Alternatively, according to at least some example embodiments, the first network entity performs these actions based on local configuration available at the first network entity.

According to at least some example embodiments, the first network entity comprises the EASDF or the UPF and is instructed by the SMF functioning as the second network entity. According to at least some example embodiments, the SGW-C and/or PGW-C instructs the SGW-U and/or PGW-U.

According to at least some example embodiments, the second network entity instructs the first network entity to respond the DNS query which carries the Client Subnet option with a response "REFUSED". For example, according to at least some example embodiments, the user plane is instructed to report the client subnet option to the control plane and the control plane forwards the REFUSED response via the user plane to the UE.

Without EASDF or according to the prior art, if UE adds EDNS client subnet option in DNS Query, according to [C], DNS server in its DNS response to the UE also keeps this option in the DNS response.

In case the EASDF is added by the 5GC as DNS proxy (as specified in 3GPP Rel-17) then this DNS query from UE goes to EASDF first which, according to at least some example embodiments, replaces the EDNS client subnet option with another EDNS client subnet option e.g. as instructed by SMF to EASDF e.g. to better resolve DNS query to suite specific UPF deployment and UE location etc. This then gets resolved by DNS server, and the DNS server responds to EASDF with the EDNS client subnet information (EDNS client subnet option) as added/provided by the EASDF (and not the one provided by the UE). EDNS client subnet information from EASDF indicates some 5GC specific deployment information, e.g. PSA-UPF IP address in this case, which need not be revealed to the UE. To avoid this, according to at least some example embodiments, EASDF replaces back the EDNS client subnet information in the DNS response before sending to the UE to the one provided by the UE in the DNS query to the EASDF.

According to at least some example embodiments, the following problems are solved:
  (1) According to [A], in case of above indicated scenario
    a), an EASDF adds the EDNS Client Subnet option to DNS query pointing to the IP address range associated with the UPF/DNAI being pre-selected by SMF. According to [C], chapter 7.2.1, the Authoritative Name Server MUST include an ECS option in its DNS response. However, according to the related EAS discovery procedure in [A], the ECS option is returned to the UE. This is often undesirable as this means that business critical information e.g. internal UPF details that are internal of the PLMN is revealed to the outside.

(2) In case of above indicated scenario b), [A] specifies that EASDF adds EDNS Client Subnet Option to the DNS query, without providing any details on EASDF logic and/or SMF configuration information provided to EASDF related to what happens in case UE already includes this option in the DNS query. According to [C] and [D], chapter 6.1.1, only one OPT is allowed in Extension Mechanism for DNS (EDNS(0)).

Now reference is made to FIG. 1 showing a flowchart illustrating a process 1 according to at least some example embodiments.

According to at least some example embodiments, process 1 is performed by the first network entity.

In step S101, a first message is received from a user equipment, the first message including at least first information regarding a domain name server query. Then, process 1 advances to step S103.

In step S103, in accordance with a first handling rule, the first message is processed by including second information regarding a subnet option into the first message, and the processed first message is forwarded to a domain name server, such as a DNS server. Then, process 1 advances to step S105.

For example, the subnet option enables the domain name server query and the response to also contain information on a subnet where a respective entity of the domain name server query is hosted. For example, the second information comprises core network specific deployment information.

In step S105, a second message is received from the domain name server, the second message including a response to the domain name server query and the second information. Then, process 1 advances to step S107.

In step S107, in accordance with a second handling rule, the second message is processed by replacing the second information, and the processed second message is forwarded to the user equipment. Then, process 1 ends.

In case of above indicated scenario a), according to at least some example embodiments, in step S107, the second information is omitted, and the second message from which the second information has been omitted is forwarded to the UE.

In case of above indicated scenario b), that is, in case the first message further includes third information regarding the subnet option, according to at least some example embodiments, in step S103, the third information in the first message is replaced by the second information, and the processed first message including the second information instead of the third information is forwarded to the domain name server. The second information is different from the third information. Further, according to at least some example embodiments, in step S107, the second information in the second message is replaced by the third information, and the processed second message including the third information instead of the second information is forwarded to the UE.

According to at least some example embodiments, the replacing the second information in step S107 comprises replacing the second information by fourth information regarding the subnet option, the fourth information being different from the second information. According to at least some example embodiments, the fourth information does not contain any network internal information.

According to at least some example embodiments, in case the first message includes the third information regarding the subnet option, the domain name server query is refused, e.g. in case of EAS discovery with local DNS server/resolver as defined in clause 6.2.3.2.3 of [A].

According to at least some example embodiments, the first and second handling rules are received from another network entity of the communication network, e.g. the second network entity.

According to at least some example embodiments, the first network entity is (pre-) configured with the first and second handling rules.

Figure 2:
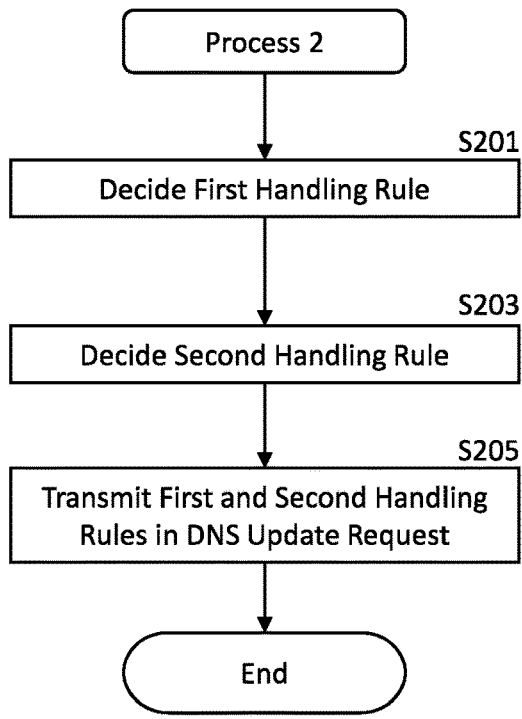
FIG. 2 shows a flowchart illustrating a process 2 according to at least some example embodiments.

Now reference is made to FIG. 2 showing a flowchart illustrating a process 2 according to at least some example embodiments. According to at least some example embodiments, process 2 is performed by the second network entity.

In step S201, a first handling rule of processing a first message from a user equipment is decided. This processing comprises including information regarding a subnet option into the first message. Then, process 2 advances to step S203.

In step S203, a second handling rule of processing a second message towards a user equipment is decided. This processing comprises removing the information regarding the subnet option from the second message. Then, process 2 advances to step S205.

In step S205, a domain name system update request including the first and second handling rules is sent to another network entity for exchanging domain name system messages from the user equipment, e.g. the first network entity.

In step S201, according to at least some example embodiments, the first handling rule is decided as follows:
  in a first case in which the first message includes first information regarding a domain name server query and further includes third information regarding the subnet option, the processing of including information regarding the subnet option into the first message comprises replacing the third information by second information, the second information being different from the third information;
  in a second case in which the first message includes the first information but does not include information regarding the subnet option, the processing of including information regarding the subnet option into the first message comprises including the second information.

In step S203, according to at least some example embodiments, the second handling rule is decided as follows:
  in the first case, the processing of removing the information regarding the subnet option from the second message comprises replacing the second information by the third information;
  in the second case, the processing of removing the information regarding the subnet option from the second message comprises omitting the second information.

In the following, further details of processes 1 and 2 will be described.

For the case that the UE DNS Query is to be handled by EASDF, the following applies.

The AF may provide EAS Deployment Information to NEF which may store it in UDR, as defined in clause 6.2.3.4 of [A]. SMF may retrieve EAS Deployment Information from NEF as described in clause 6.2.3.4 of [A] or has locally preconfigured information. EAS Deployment Information is used for creating DNS message handling rule on EASDF and it is not dedicated to specific UE session(s).

EAS Deployment Information may apply to all PDU Sessions with a certain DNN, S-NSSAI and/or specific Internal Group Identifier(s).

The SMF may provide BaselineDNSPattern to EASDF, the BaselineDNSPattern are derived from EAS Deployment Information provided by AF and are not dedicated to specific PDU Session; SMF configures EASDF with BaselineDNSPattern according to the procedures defined in clause 6.2.3.4 of [A].

The Baseline DNS message detection template ID may be used by the EASDF to refer to Baseline DNS message detection template, and derive array of FQDN ranges and/or array of EAS IP address ranges. The Baseline DNS handling actions ID may be used by the EASDF to refer to Baseline DNS handling actions information, and derive actions related parameters.

The Baseline DNS message detection template ID and the Baseline DNS handling actions ID are unique per SMF set when a SMF set controls an EASDF and shall be unique per SMF otherwise, within an EASDF Baseline.

BaselineDNSPattern may contain one or several items, where each item is either a Baseline DNS message detection template or a Baseline DNS handling actions information. Each BaselineDNSPattern item may be updated or deleted using Baseline DNS message detection template ID or Baseline DNS handling actions ID to identify the updated or deleted item Baseline DNS message detection template
  Baseline DNS message detection template ID
  DNS message type=DNS Query or DNS Response:
    If DNS message type=DNS Query:
      Array of (FQDN ranges).
    If DNS message type=DNS Response:
      Array of FQDN ranges and/or array of EAS IP address ranges.

Baseline DNS handling actions information:
  Baseline DNS handling actions ID:
  ECS option.
  Local DNS server IP address.

NOTE 1: The FQDN can be set to wildcard to indicate the default DNS Server (e.g. the C-DNS), for the case in which the DNS message should be forwarded to the default DNS Server.

NOTE 2: The BaselineDNSPattern can be configured for a specific application with the related FQDN set in the detection template.

NOTE 3: The definition of structure of Baseline DNS handling actions ID and Detection template ID is left to stage 3. As an example, Baseline DNS handling action ID and Detection template ID could contain a concatenation of the SMF ID or SMF set Id and of SMF implementation selected information such as the DNAI or a sequence number. The EASDF is not meant to understand the structure of Baseline DNS handling actions ID and Detection template ID.

During the PDU Session establishment procedure, the SMF may obtain the EAS Deployment Information from the NEF if not already retrieved (by subscription of such information to the NEF as described in clause 6.2.3.4.3 of [A]) or the SMF is preconfigure with the EAS Deployment Information and the SMF selects an EASDF and provides its address to the UE as the DNS Server to be used for the PDU Session.

The SMF configures the EASDF with DNS message handling rules to handle DNS messages related to the UE(s). The DNS message handling rule has a unique identifier and includes information used for DNS message detection and associated action(s). The DNS handling rules is defined as following:

Precedence of the DNS message handling rule;
DNS Handling Rule Identity;
A Baseline DNS message detection template ID and/or a DNS message detection template (optional and includes at least one of the following, if existing):
  DNS message type=DNS Query or DNS Response:
    If DNS message type=DNS Query:
      Source IP address (i.e. UE IP address).
      Array of (FQDN ranges) (optional).
    If DNS message type=DNS Response:
      Array of FQDN ranges and/or array of EAS IP address ranges (optional).
DNS message Identifier (if received from EASDF);

NOTE 4: For DNS message type=Query, the UE IP address provided at DNS context creation (Neasdf_DNSContext_Create Request) is considered if not provided explicitly as part of the DNS message detection template.

NOTE 5: DNS message Identifier is used by EASDF for matching between the message reported in the Neasdf_DNSContext_Notify and the corresponding DNS message handling rule included in Neasdf_DNSContext_Update.

Action(s) (includes at least one action); the possible actions include:
  Reporting Action: Report DNS message content to SMF (i.e. target FQDN and if available: IP address information provided back by the DNS server). This reporting action may include reporting-once indication. If this indication is included, the EASDF reports the DNS message content to the SMF once if the DNS message detection template matches the first incoming DNS Query or DNS Response message.

NOTE 6: With reporting-once indication, the DNS message detection template should contain the EAS IP address ranges corresponding to the same DNAI. Resetting the Reporting-once indication can be used by the SMF to allow reporting associated with a DNS handling rule when the SMF has removed the UL-CL/BP e.g. when the UE has moved out of the area associated with the current DNAI and thus insertion of a new UPF offloading capability can be considered.

Forwarding Action: Send the DNS message(s) to a DNS server/resolver(s) as follows:
  A. (possibly) Including the information to build optional EDNS Client Subnet option or, according to at least some example embodiments, if already included in the message from UE, to replace the EDNS Client Subnet option in the DNS message. The information for the EASDF to build the EDNS Client Subnet option is either included in the DNS handling rule, or Baseline DNS handling actions ID acts as a reference to the Baseline DNS handling actions Information. This corresponds to the option A defined below.
  B. The information for the DNS message target address is either included as DNS Server Address indicated in the DNS handling rule, or the Baseline DNS handling actions ID included in the DNS handling rules refers to DNS message target address information; if no DNS Server Address is provided by the SMF in the rule, then the EASDF is to forward the DNS message to a locally preconfigured default DNS server/resolver. This corresponds to the option B defined below.

NOTE 7: The forwarding action can include either A or B.

Forwarding Action according to at least some example embodiments: Send the DNS message(s) to a UE as follows:

C. (possibly) Including the information to build optional EDNS Client Subnet option or, if received in the response message from DNS server, to replace the EDNS Client Subnet option in the DNS message towards the UE.

NOTE 7A: Alternatively, according to at least some example embodiments, based on local configuration at the EASDF the EASDF may insert/replace the EDNS Client Subnet option, which was received in the DNS query message from UE and was removed by the EASDF from the DNS query.

Control Action: Performs at least one of control actions on the DNS message(s) as follows:
Buffer the DNS message(s).
Send the buffered DNS Response(s) message to UE.
Discard cached DNS Response message(s).

When the EASDF forwards a DNS message (to the UE or towards a DNS server over N6), it uses its own address as the source address of the DNS message.

The SMF may use following information to create DNS message handling rules associated with a PDU Session:
Local configuration associated with the (DNN, S-NSSAI, Internal Group Identifier) of the PDU Session; and/or
EAS Deployment Information provided by the AF or preconfigured in the SMF; and/or
Information derived from the UE location such as candidate L-PSA(s); and/or
PDU Session information, like PDU Session L-PSA(s) and ULCL/BP; and/or
Internal Group Identifier received in the Session Management Subscription data from the UDM;

NOTE 7: For example, the SMF can derive the IP address for ECS based on the N6 IP address(es) associated with serving L-PSA(s) locally configured or in the NRF.

NOTE 8: Providing in DNS EDNS Client Subnet option an IP address associated with the L-PSA UPF protects the privacy of the (IP address of the) UE.

If the FQDN in a DNS Query matches the FQDN(s) provided by the SMF in a DNS message detection template, based on instructions by SMF, one of the following options is executed by the EASDF based on a corresponding DNS message handling rule:

Option A: According to at least some example embodiments, the EASDF includes or if already included by UE then it replaces an EDNS Client Subnet (ECS) option into the DNS Query message and sends the DNS Query message to the DNS server for resolving the FQDN.

Option B: The EASDF sends the DNS Query message to a Local DNS server which is responsible for resolving the FQDN within the corresponding L-DN.

NOTE 9: Option B does not support the scenario where the PSA UPF for transferring DNS Query between EASDF and DNS server, or the EASDF has no direct connectivity with the Local DNS servers.

Option C:
The DNS server may resolve the EAS IP address considering the EDNS Client Subnet option and sends the DNS Response to the EASDF.
The EASDF receives the DNS Response message from the Local DNS server.

According to at least some example embodiments, the EASDF removes the EDNS Client Subnet option from the received response message or, if it had received EDNS Client Subnet option in the DNS query message from UE, then replaces in the message from DNS server or from local DNS server, the EDNS Client Subnet option in the DNS message based on instruction from SMF or based on local configuration at the EASDF with the EDNS Client Subnet option received and removed in/from the DNS query.

The SMF instructions for a matching FQDN may as well indicate EASDF to contact SMF. SMF then provides the EASDF with a DNS message handling rule;

If the DNS Query from the UE does not match a DNS message handling rules set by the SMF, then, according to at least some example embodiments, the EASDF depending on local configuration may remove a possibly received EDNS Client Subnet option from the DNS query or may simply forward the DNS Query unchanged towards a preconfigured DNS server/resolver for DNS resolution;

When the EASDF receives a DNS Response message, the EASDF notifies the EAS information (i.e. EAS IP address (es), the EAS FQDN and if available the corresponding IP address within the ECS DNS option) to the SMF if the DNS message reporting condition provided by the SMF is met (i.e. the EAS IP address or FQDN is within the IP/FQDN range), and, according to at least some example embodiments, the EASDF notifies to the SMF if the EASDF inserts the possibly removed EDNS Client Subnet option into the DNS response. The SMF may then select the target DNAI based on the EAS information and trigger UL CL/BP and L-PSA insertion as specified in clause 6.3.3 in TS 23.501 based on the Notification.

NOTE 10: To avoid SMF overloading caused by massive reporting, the overload control mechanisms defined in clause 6.4 of TS 29.500 can be used.

The information to build the EDNS Client Subnet option or the Local DNS server address provided by the SMF to the EASDF are part of the DNS message handling rules to handle DNS Queries from the UE. This information is related to DNAI(s) for that FQDN(s) for the UE location. The SMF may provide DNS message handling rules to handle DNS Queries from the UE to the EASDF when the SMF establishes the association with the EASDF for the UE and may update the rules at any time when the association exists. For the selection of the candidate DNAI for a FQDN for the UE, the SMF may consider the UE location, network topology, EAS Deployment Information and related policy information for the PDU Session provided as defined in TS 23.503, clause 6.4 or be preconfigured into the SMF. After the UE mobility, if the provided Information for EDNS Client Subnet option or the Local DNS server address needs to be updated, the SMF may send an update of DNS message handling rules to the EASDF.

NOTE 11: If multiple candidate DNAIs are available after considering the UE location, network topology and EAS deployment, the SMF selects one DNAI from the multiple ones based on operator's policy. For examples, the SMF can select the DNAI randomly, or based on selection weight factor if provided by AF, or select the DNAI closest to the UE location.

NOTE 12: To protect the SMF (e.g. to block DOS from the EASDF), the EASDF IP address for DNS Query Request is only accessible from the UE IP address via UPF.

Once the UL CL/BP and L-PSA have been inserted, the SMF may decide that the DNS messages for the FQDN are to be handled by Local DNS resolver/server from now on. This option is further described in clause 6.2.3.2.3 of [A].

To avoid EASDF sending redundant DNS message reports triggering UL CL/BP insertion corresponding to the same DNAI, the SMF may send reporting-once control information (i.e. DNS message handling rule with DNS message detection template containing EAS IP address ranges with reporting-once indication set) to EASDF to instruct the EASDF to report only once for the DNS messages matching with the DNS message detection template of the reporting-once control information for the DNS message detection template. In addition, the SMF may instruct the EASDF not to report DNS Responses to SMF corresponding to some FQDN ranges and/or EAS IP address ranges e.g. once the UL CL/BP and L-PSA have been inserted for the corresponding EAS IP address ranges for Pre-established session breakout while there is configuration for the related EASDF reporting DNS Responses. After the removal or change of the L-PSA, the SMF may instruct the EASDF to restart the reports of the DNS messages. If the SMF, based on local configuration, decides that the interaction between EASDF and DNS Server in the DN shall go via an UPF, the SMF sends corresponding N4 rules to this UPF to instruct this UPF to forward DNS message between EASDF and the external DNS server. In this case, DNS messages between EASDF and DNS Server described in this clause are transferred via this UPF transparently.

NOTE 13: Based network configuration, one UPF is used to transmit DNS signaling between EASDF and DNS servers. The N4 session between the SMF and this UPF is not related to a specific PDU Session but provides rules targeting Downlink traffic from DNS servers to the EASDF and associated with the traffic of multiple UE(s); the traffic forwarding between EASDF and this UPF is realized by IP in IP tunneling. The EASDF provides the SMF with the source address it uses to contact DNS servers and with the destination address where it expects to receive the tunneled traffic.

Figure 3:
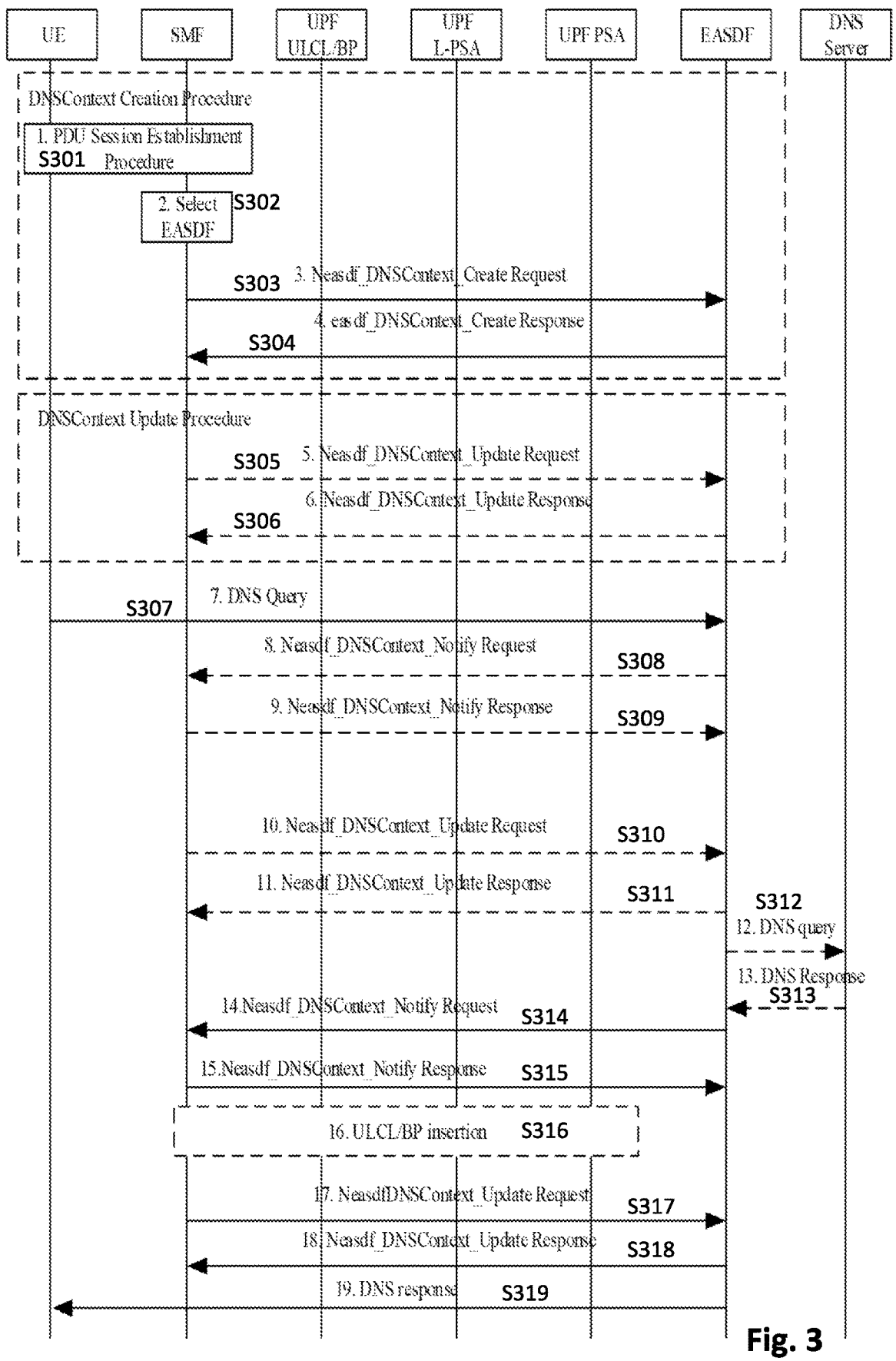
FIG. 3 shows a signaling diagram illustrating signaling according to at least some example embodiments.

FIG. 3 illustrates an EAS discovery procedure with EASDF according to at least some example embodiments.

In step S301, a UE sends a PDU Session Establishment Request to an SMF as shown in step 1 of clause 4.3.2.2.1 of TS 23.502. The SMF retrieves UE subscription information from a UDM (which may optionally include an indication on UE authorization for EAS discovery via EASDF) and checks if the UE is authorized to discover an EAS via an EASDF. If not authorized, this procedure is terminated, and the subsequent steps are skipped.

In step S302, during a PDU Session Establishment procedure, the SMF selects EASDF as described clause 6.3 of TS 23.501. The SMF may consider the UE subscription information to select an EASDF as the DNS server of the PDU Session.

The SMF may indicate to the UE either that for the PDU Session the use of EDC functionality is allowed or that for the PDU Session the use of the EDC functionality is required.

If the SMF, based on local configuration, decides that the interaction between EASDF and DNS Server in the DN shall go via a PSA UPF, the SMF configures PSA UPF within N4 rules to forward the DNS message between EASDF and DN.

In step S303, the SMF invokes Neasdf_DNSContext_Create Request (UE IP address, SUPI, DNN, notification endpoint, (DNS message handling rules)) to the selected EASDF.

This step is performed before step 11 of PDU Session Establishment procedure in clause 4.3.2.2.1 of TS 23.502.

The EASDF creates a DNS context for the PDU Session and stores the UE IP address, SUPI, the notification endpoint and potentially provided DNS message handling rule(s) into the context.

The EASDF is provisioned with the DNS message handling rule(s), before the DNS Query message is received at the EASDF or as a consequence of the DNS Query reporting.

In step S304, the EASDF invokes the service operation Neasdf_DNSContext_Create Response.

After this step, the SMF includes the IP address of the EASDF as DNS server/resolver for the UE in the PDU Session Establishment Accept message as defined in step 11 of clause 4.3.2.2.1 of TS 23.502. The UE configures the EASDF as DNS server for that PDU Session.

If the UE requested to obtain UE IP address via DHCP and the SMF supports DHCP based IP address configuration, the SMF responds to the UE via DHCP response with the allocated UE IP address and/or the DNS server address containing the IP address of the EASDF.

In step S305, the SMF may invoke Neasdf_DNSContext_Update Request (EASDF Context ID, (DNS message handling rules)) to EASDF. The update may be triggered by UE mobility, e.g. when UE moves to a new location, or by a reporting by EASDF of a DNS Query with certain FQDN, or, the update may be triggered by insertion/removal of Local PSA, e.g. to update rules to handle DNS messages from the UE or by new PCC rule information.

In step S306, the EASDF responds with Neasdf_DNSContext_Update Response.

In step S307, if required (see clause 5.2.1 of [A]), the Application in the UE uses the EDC functionality as described in clause 6.2.4 of [A] to send the DNS Query to the EASDF. The UE sends a DNS Query message to the EASDF.

In step S308, if the DNS Query message matches a DNS message detection template of DNS message handling rule for reporting, the EASDF sends the DNS message report to SMF by invoking Neasdf_DNSContext_Notify Request (information from the DNS Query e.g. target FQDN of the DNS Query). The EASDF may add a DNS message identifier in the Neasdf_DNSContext_Notify. The DNS message identifier uniquely identifies the DNS message reported and is used to associate the corresponding DNS message handling rule included in Neasdf_DNSContext_Update Request with the identified DNS message. The DNS message identifier is generated by EASDF.

In step S309, the SMF responds with Neasdf_DNSContext_Notify Response.

In step S310, according to at least some example embodiments, if DNS message handling rule for the FQDN received in the report needs to be updated, e.g. provide updates to information to build/replace the EDNS Client Subnet option information, the SMF invokes Neasdf_DNSContext_Update Request (DNS message handling rules) to EASDF. If the EASDF provided a DNS message identifier, the SMF adds this DNS message identifier to the corresponding DNS message handling rule included in Neasdf_DNSContext_Update. If the EASDF did not provide a DNS message identifier, the SMF may use the DNS message type (Request) and the target FQDN to uniquely identify the DNS message.

For Option A, according to at least some example embodiments, the DNS handling rule includes corresponding IP address to be used to build/replace the EDNS Client Subnet option. For Option B, according to at least some example embodiments, the DNS handling rule includes corresponding Local DNS Server IP address and indication to remove possible EDNS Client Subnet option. Alternatively, according to at least some example embodiments, based on local configuration the EASDF may remove possible EDNS Client Subnet option. The EASDF may as well be instructed by the DNS handling rule to simply forward the DNS Query to a pre-configured DNS server/resolver.

In step S311, if the SMF provided a DNS message handling rule with DNS message identifier, the EASDF only applies the DNS message handling rule to the corresponding DNS message. The EASDF responds with Neasdf_DNSContext_Update Response.

In step S312, the EASDF handles the DNS Query message received from the UE as the following:
For Option A, according to at least some example embodiments, the EASDF adds/replaces the EDNS Client Subnet option into the DNS Query message as specified in [B] and sends it to C-DNS server;
For Option B, according to at least some example embodiments, the EASDF, based on instruction from the SMF or depending on local configuration, removes a possibly received EDNS Client Subnet option and sends the DNS Query message to the Local DNS server.

If no DNS message detection template within the DNS message handling rule provided by the SMF matches the requested FQDN in the DNS Query, the EASDF may simply send a DNS Query to a pre-configured DNS server/resolver.

In step S313, the EASDF receives a DNS Response including EAS IP addresses which is determined by the DNS system and determines that a DNS Response can be sent to the UE.

In step S314, the EASDF sends DNS message reporting to the SMF by invoking Neasdf_DNSContext_Notify request including EAS information if the EAS IP address or the FQDN in the DNS Response message matches the DNS message detection template provided by the SMF. The DNS message reporting may contain multiple EAS IP address if the EASDF has received multiple EAS IP address(es) from the DNS server it has contacted. The DNS message reporting may contain the FQDN and the EDNS Client Subnet option received in the DNS Response message. The EASDF may also add DNS message identifier to the reporting. The DNS message identifier uniquely identifies the DNS response reported, and the EASDF can associate the corresponding DNS message handling rule included in Neasdf_DNSContext_Update Request with the identified DNS response. The DNS message identifier is generated by EASDF.

Per the received DNS message handling rule, the EASDF does not send the DNS Response message to the UE but waits for SMF instructions (in step S317), i.e. buffering the DNS Response message.

If the DNS Response(s) is required to be buffered and reported to the SMF, when the reporting-once control information is set, EASDF only reports to SMF once by invoking Neasdf_DNSContext_Notify request for DNS Responses matching with the DNS message detection template.

In step S315, the SMF invokes Neasdf_DNSContext_Notify Response service operation.

In step S316, the SMF may perform UL CL/BP and Local PSA selection and insert UL CL/BP and Local PSA.

Based on EAS information received from the EASDF in Neasdf_DNSContext_Notify, other UPF selection criteria, as specified in clause 6.3.3 in TS 23.501, and possibly Service Experience or DN performance analytics for an Edge Application as described in TS 23.288, the SMF may determine the DNAI and determine the associated N6 traffic routing information for the DNAI. The SMF may perform UL CL/BP and Local PSA selection and insertion as described in TS 23.502. In case of UL CL, the traffic detection rules and traffic routing rules are determined by the SMF based on IP address range(s) per DNAI included in the EAS Deployment Information or according to PCC rule received from PCF or according to preconfigured information.

In step S317, the SMF invokes Neasdf_DNSContext_Update Request (DNS message handling rules). If the EASDF provided a DNS message identifier, the SMF adds this to the corresponding DNS message handling rule included in Neasdf_DNSContext_Update Request. If the EASDF did not provide a DNS message identifier, the SMF may use the DNS message type (Response) and the FQDN to uniquely identify the DNS response message.

The DNS message handling rule with the Control Action "Send the buffered DNS response(s) message to UE" indicates the EASDF to send DNS Response(s) buffered in step S314 to UE. Other DNS message handling rule may indicate the EASDF not to send further DNS Response message(s) corresponding to FQDN ranges and/or EAS IP address ranges.

In step S318, if the SMF provided a DNS message handling rule with DNS message identifier, the EASDF only applies the DNS message handling rule to the corresponding DNS response. The EASDF responds with Neasdf_DNSContext_Update Response.

In step S319, according to at least some example embodiments, if indicated to send the buffered DNS response(s) to UE in step S317, the EASDF removes the EDNS Client Subnet option from the Response, inserts that EDNS Client Subnet Option which was removed from the DNS query in step S312 and sends the DNS Response(s) to the UE.

During PDU Session Release procedure, the SMF removes the DNS context by invoking Neasdf_DNSContext_Delete service.

For the case that the DNS message is to be handled by Local DNS resolver/server, the DNS Query is routed to the Local DNS resolver/server corresponding to the DNAI where the L-PSA connects. The SMF selects the Local DNS server address based on the DNAI corresponding to the inserted local PSA, local configuration and based on EAS Deployment Information in AF request as specified in clause 6.2.3.4.2 of [A]. Based on the operator's configuration, one of the following options may apply when UL CL/BP and Local PSA have been inserted (during or after PDU Session Establishment):

Option C: The SMF configures the local DNS server to the UE as new DNS server. The SMF may indicate to the UE either that for the PDU Session the use of the EDC functionality is allowed or that for the PDU Session the use of the EDC functionality is required. In addition, the SMF also configures traffic routing rule on the UL CL (including e.g. Local DNS server address) or the BP (e.g. the new IP prefix @ Local PSA) to route traffic destined to the L-DN including the DNS Query messages to the L-PSA. The L-DNS server resolves the DNS Query either locally or recursively by communicating with other DNS servers.

Option D: If the SMF has been configured that DNS Queries for an FQDN (range) query can be locally routed on the UL CL, then the subsequent DNS Queries for the FQDN (range) will be locally routed to a Local DNS server.

NOTE 1: Option D assumes that ULCL steering is based on L4 information (i.e. DNS port number) and that ULCL has visibility of the DNS traffic (i.e. FQDN in the DNS Query message). The UPF may be instructed by the SMF to apply different forwarding of non-ciphered UL DNS traffic based on the target domain of the DNS Query. Option D requests modification of destination IP address of DNS messages. Whether this is allowed or not is subject to local regulations. Option D does not apply to DoH or DoT messages.

NOTE 1A: It is the decision of the application in the UE whether to use the EDNS Client Subnet Option or not to resolve the FQDN. If it uses the EDNS functionality, the usage of the EAS (re-)discovery procedures defined in clause 6.2.3.2.3 of [A] cannot be ensured.

Figure 4:
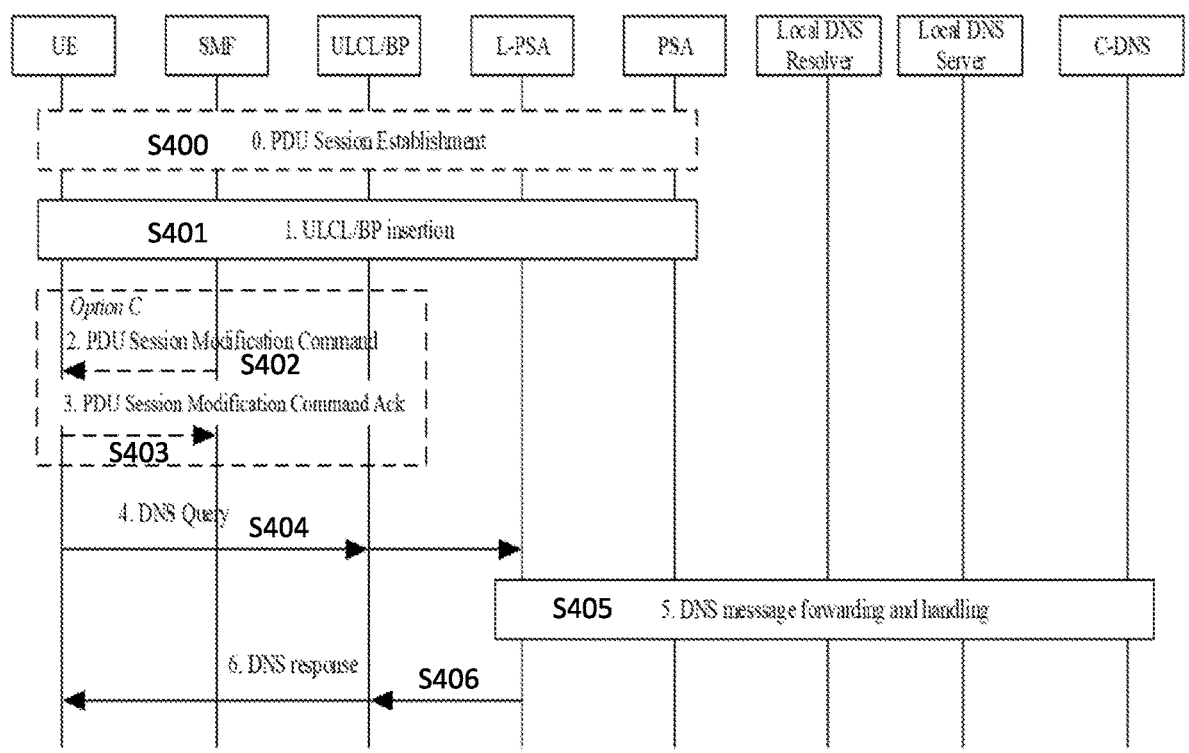
FIG. 4 shows a signaling diagram illustrating signaling according to an EAS discovery with a local DNS server/resolver.

FIG. 4 illustrates EAS discovery with local DNS server/resolver.

In step S400, a UE sends a PDU Session Establishment Request to an SMF as shown in step 1 of clause 4.3.2.2.1 of TS 23.502. The SMF retrieves the UE subscription information from the UDM (which may optionally include an indication on UE authorization for EAS discovery via EASDF) and checks if the UE is authorized to discover the EAS via EASDF. If not authorized, the actions related to EASDF in this procedure are skipped.

In step S401, the SMF inserts UL CL/BP and Local PSA.

UL CL/BP/Local PSA insertion can be triggered by DNS messages as described in clause 6.2.3.2.2 of [A]. Or, the SMF may pre-establish the UL CL/BP and Local PSA before the UE sends out any DNS Query message (e.g. upon UE mobility). In this case, the SMF includes the IP address of Local DNS Server in PDU Session Establishment Accept message as in step 11 of clause 4.3.2.2.1 of TS 23.502 or in a network initiated PDU Session Modification procedure. The UE configures the Local DNS Server as DNS server for that PDU Session.

NOTE 2: If the new DNS server address is provided to the UE, the UE can refresh all EAS(s) information (e.g. DNS cache) bound to the PDU Session, based on UE implementation.

The UL CL/BP and Local PSA are inserted or changed as described in TS 23.502. In the case of IPv6 multi-homing, the SMF may also send an IPv6 multi-homed routing rule along with the IPv6 prefix to the UE to influence the selection of the source Prefix for the subsequent DNS Queries as described in TS 23.501, clause 5.8.2.2.2.

When the UL CL/BP and Local PSA are inserted or simultaneously changed, the SMF configure the UL CL/BP for DNS Query handling:

For Option C, the SMF configures traffic routing rule on the UL CL (including e.g. Local DNS server address) or the BP (e.g. the new IP prefix @ Local PSA) to forward UE packets destined to the L-DN to the Local PSA. The packets destined to L-DN includes DNS Query messages destined to Local DNS Server.

Steps S402 and S403 are performed for option C:

In step S402, if the UL CL/BP and Local PSA are inserted after PDU Session Establishment, the SMF sends PDU Session Modification Command (Local DNS Server Address) to UE.

If, based on operator's policy or UE's mobility, the Local DNS Server IP address in the local Data Network needs to be notified or updated to UE, the SMF sends PDU Session Modification Command (Local DNS Server Address) to UE.

In step S403, the UE responds with PDU Session Modification Command Ack.

The UE configures the Local DNS Server as the DNS server for the PDU Session. The UE sends the following DNS Queries to the indicated Local DNS Server.

If EASDF was used as the DNS server for the PDU Session, the SMF may invoke Neasdf_DNSContext_Delete service to remove the DNS context in the EASDF.

NOTE 3: The UE does not need to know that the new DNS server is "local".

For the Split-UE in the option C case, the new address of Local DNS Server cannot be provided to the TE or the TE OS from the MT, Annex C of [A] documents mitigations for this scenario.

In step S404, if required (see clause 5.2.1 of [A]), the application in the UE uses the EDC functionality as described in clause 6.2.4 of [A] to send the DNS Query to the DNS Resolver/DNS Server indicated by the SMF in Step S400. UE sends a DNS Query message. In the case of IPv6 multi-homing the UE selects the source IP prefix based on the IPv6 multi-homed routing rule provided by SMF.

In step S405, the DNS Query message is forwarded to the Local DNS Server and handled as described in following:

For Option C, the target address of the DNS Query is the IP address of the Local DNS Server. The DNS Query is forwarded to the Local DNS Server by UL CL/BP and Local PSA. The Local DNS Server resolves the FQDN of the DNS Query by itself or communicates with other DNS server to recursively resolve the EAS IP address.

For Option D: The Local PSA sends the DNS traffic to the Local DNS Server that resolves the FQDN target of the DNS Query by itself or that communicates with a C-DNS server to recursively resolve the EAS IP address.

NOTE 4: The Local PSA can send the DNS traffic to the Local DNS Server via tunnelling or via IP address replacement. If IP address replacement is used, the SMF sends the IP address of the Local DNS Server to the Local PSA and instructs the Local PSA to modify the packet's destination IP address (corresponding to EASDF) to that of the Local DNS Server.

In step S406, the Local PSA receives DNS Response message from Local DNS server, it forwards it to the UL CL/BP and the UL CL/BP forwards the DNS Response message to UE.

NOTE 5: If IP address replacement has been enforced at step S405, the Local PSA replaces the source IP address to EASDF IP according to SMF instruction.

If SMF decides to remove the UL CL/BP and Local PSA as defined in TS 23.502, clause 4.3.5.5, e.g. due to UE mobility, the SMF sends a PDU Session Modification Command to configure the new address of the DNS server on UE (e.g. to set it to the address of EASDF).

Figure 5:
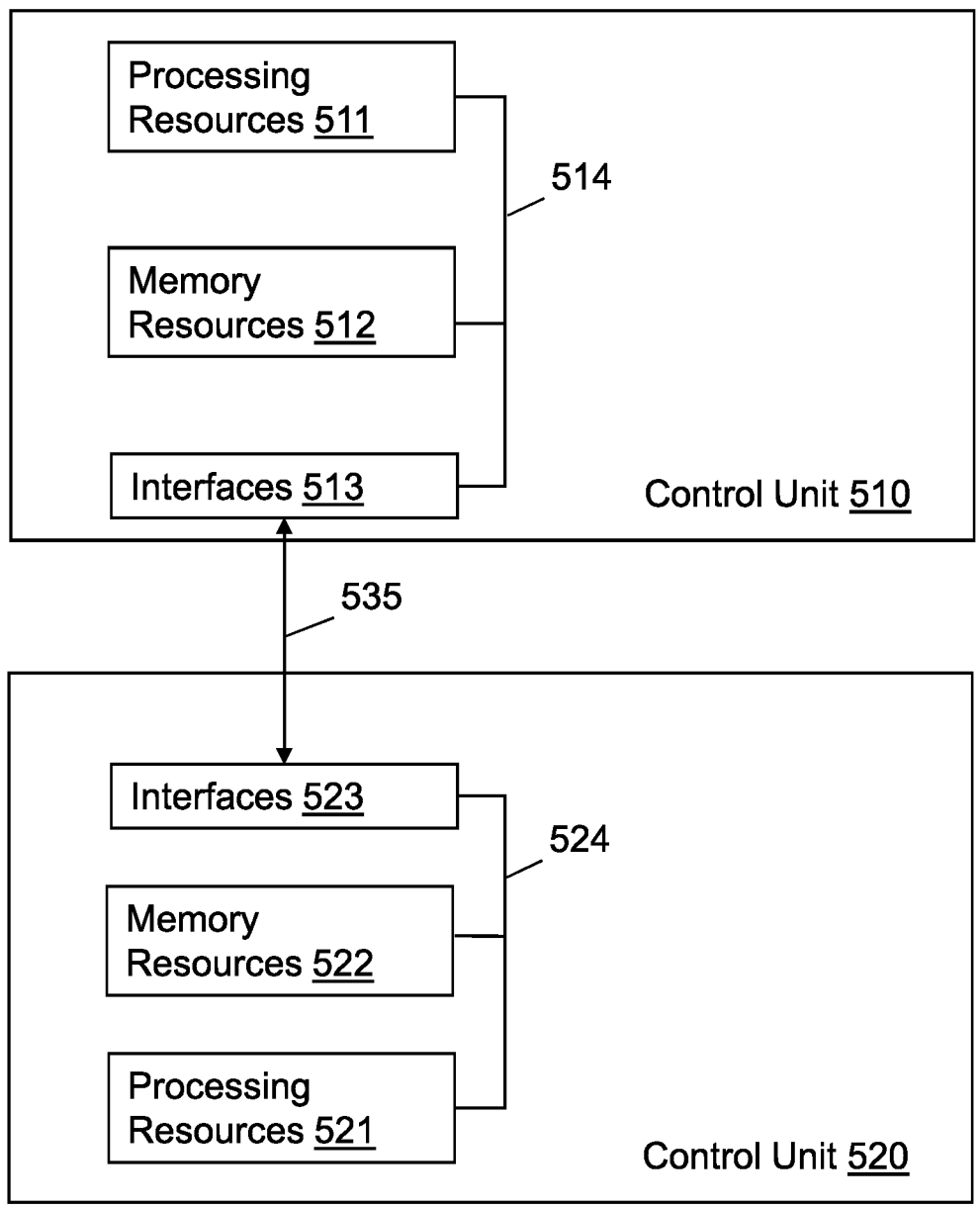
FIG. 5 shows a schematic block diagram illustrating a configuration of control units in which at least some example embodiments are implementable.

Now reference is made to FIG. 5 illustrating a simplified block diagram of control units 510, 520 that are suitable for use in practicing at least some example embodiments. According to an implementation example, process 1 illustrated in FIG. 1 is implemented by the control unit 510, and process 2 illustrated in FIG. 2 is implemented by the control unit 520.

The control units 510, 520 comprise processing resources (e.g. processing circuitry) 511, 521, memory resources (e.g. memory circuitry) 512, 522 and interfaces (e.g. interface circuitry) 513, 523, which are coupled via a wired or wireless connection 514, 524.

The control unit 510 is coupled via its interfaces 513 to the control unit 520 through a wired or wireless connection 535. The control unit 520 is coupled via its interfaces 523 to the control unit 510 through the wired or wireless connection 535.

According to an example implementation, the memory resources 512, 522 are of any type suitable to the local technical environment and are implemented using any suitable data storage technology, such as semiconductor based memory devices, magnetic memory devices and systems, optical memory devices and systems, fixed memory and removable memory. The processing resources 511, 521 are of any type suitable to the local technical environment, and include one or more of general purpose computers, special purpose computers, microprocessors, digital signal processors (DSPs) and processors based on a multi core processor architecture, as non-limiting examples.

According to an implementation example, the memory resources 512, 522 comprise one or more non-transitory computer-readable storage media which store one or more programs that when executed by the processing resources 511, 521 cause the control unit 510, 520 to function as first network entity or second network entity as described above.

Further, as used in this application, the term "circuitry" may refer to one or more or all of the following:
(a) hardware-only circuit implementations (such as implementations in only analog and/or digital circuitry) and
(b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

The term "non-transitory", as used herein, is a limitation of the medium itself (i.e., tangible, not a signal) as opposed to a limitation on data storage persistency (e.g., RAM vs. ROM).

It is noted that, as used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

It is to be understood that the above description is illustrative and is not to be construed as limiting. Various modifications and applications may occur to those skilled in the art without departing from the scope as defined by the appended claims.

The invention claimed is:

1. A method for use by an edge application server discovery function (EASDF) of a communication network, the method comprising:
receiving a domain name server (DNS) query message from a user equipment; and
based on the DNS query message received from the user equipment not including information regarding an extension mechanism for DNS (EDNS) client subnet option:
in accordance with a first handling rule, including, into the DNS query message, first information regarding an EDNS client subnet option, and forwarding the DNS query message including the first information regarding the EDNS client subnet option to a domain name server;
receiving a DNS response message from the domain name server, the DNS response message including a response to the DNS query and second information regarding an EDNS client subnet option; and
in accordance with a second handling rule, removing, from the DNS response message the second information regarding the EDNS client subnet option, and forwarding the DNS response message without the second information regarding the EDNS client subnet option to the user equipment.

2. The method according to claim 1, further comprising:
receiving the first and second handling rules from a session management function of the communication network.

3. The method according to claim 1, further comprising:
configuring the edge application server discovery function according to the first and second handling rules.

4. The method according to claim 1,
wherein the second information regarding the EDNS client subnet option comprises core network specific deployment information.

5. A method for use by an edge application server discovery function (EASDF) of a communication network, the method comprising:
receiving a domain name server (DNS) query message from a user equipment; and
based on the DNS query message received from the user equipment including first information regarding an extension mechanism for DNS (EDNS) client subnet option:
in accordance with a first handling rule, replacing the first information regarding the EDNS client subnet option by second information regarding the EDNS client subnet option;
receiving a DNS response message from the domain name server, the DNS response message including a response to the DNS query and third information regarding an EDNS client subnet option; and
in accordance with a second handling rule, replacing, in the DNS response message the third information regarding the EDNS client subnet option with fourth information regarding the EDNS client subnet option, and forwarding the DNS response message including the fourth information regarding the EDNS client subnet option to the user equipment.

6. The method according to claim 5, further comprising:
receiving the first and second handling rules from a session management function of the communication network.

7. The method according to claim 5, further comprising:
configuring the edge application server discovery function according to the first and second handling rules.

8. The method according to claim 5,
wherein the third information regarding the EDNS client subnet option comprises core network specific deployment information.

9. An apparatus comprising
at least one processor, and
at least one memory storing instructions that, when executed by the at least one processor, cause the apparatus to:

operate as a network entity edge application server discovery function (EASDF) of a communication network;

receive a domain name server (DNS) query message from a user equipment; and based on the DNS query message received from the user equipment not including information regarding an extension mechanism for DNS (EDNS) client subnet option:

in accordance with a first handling rule, include, into the DNS query message, first information regarding an EDNS client subnet option, and forward the DNS query message including the first information regarding the EDNS client subnet option to a domain name server;

receive a DNS response message from the domain name server, the DNS response message including a response to the DNS query and second information regarding an EDNS client subnet option; and in accordance with a second handling rule, remove, from the DNS response message the second information regarding the EDNS client subnet option, and forward the DNS response message without the second information regarding the EDNS client subnet option to the user equipment.

10. The apparatus according to claim 9, wherein the at least one memory stores instructions that, when executed by the at least one processor, cause the apparatus to:
receive the first and second handling rules from a session management function of the communication network.

11. The apparatus according to claim 9, wherein the at least one memory stores instructions that, when executed by the at least one processor, cause the apparatus to:
configure the edge application server discovery function according to the first and second handling rules.

12. The apparatus according to claim 9,
wherein the second information regarding the EDNS client subnet option comprises core network specific deployment information.

13. An apparatus comprising
at least one processor, and
at least one memory storing instructions that, when executed by the at least one processor, cause the apparatus to:

operate as a network entity edge application server discovery function (EASDF) of a communication network;

receive a domain name server (DNS) query message from a user equipment; and based on the DNS query message received from the user equipment including first information regarding an extension mechanism for DNS (EDNS) client subnet option:

in accordance with a first handling rule, replace the first information regarding the EDNS client subnet option by second information regarding the EDNS client subnet option;

receive a DNS response message from the domain name server, the DNS response message including a response to the DNS query and third information regarding an EDNS client subnet option; and in accordance with a second handling rule, replace, in the DNS response message the third information regarding the EDNS client subnet option with fourth information regarding the EDNS client subnet option, and forward the DNS response message including the fourth information regarding the EDNS client subnet option to the user equipment.

14. The apparatus according to claim 13, wherein the at least one memory stores instructions that, when executed by the at least one processor, cause the apparatus to:
receive the first and second handling rules from a session management function of the communication network.

15. The apparatus according to claim 13, wherein the at least one memory stores instructions that, when executed by the at least one processor, cause the apparatus to:
configure the edge application server discovery function according to the first and second handling rules.

16. The method according to claim 13,
wherein the third information regarding the EDNS client subnet option comprises core network specific deployment information.

* * * * *